June 12, 1928.
E. ORMAN
1,673,703
SPOON HOLDER
Filed April 7, 1927
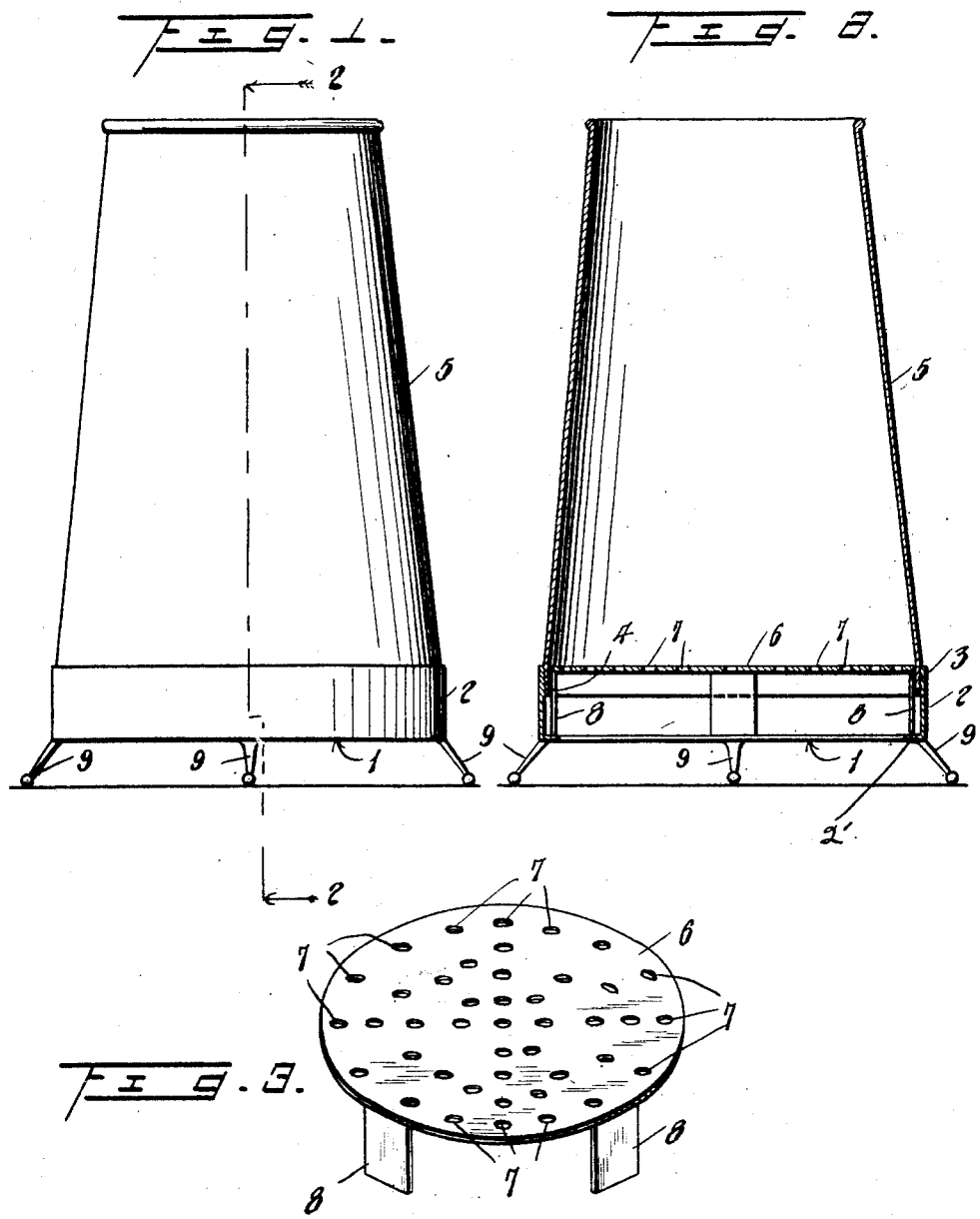

Patented June 12, 1928.

1,673,703

UNITED STATES PATENT OFFICE.

EDWARD ORMAN, OF KINGSTON, PENNSYLVANIA.

SPOON HOLDER.

Application filed April 7, 1927. Serial No. 181,793.

The invention relates to a device for holding spoons and other silverware, being particularly adapted for use by restaurants, lunch rooms, hotels, and the like where the spoons and other silverware are kept in quantities and handled by countermen, waiters, and the like, and has for its principal object the provision of a holder in which the spoons, etc., are maintained in an upright position with the handles uppermost, provision being made to hold the spoons above the bottom of the container by means of a strainer, so that any water that may be adhering to the article may drain away from it through the bottom of the container, thus avoiding the practice usually followed of spoons engaging the bottom of the receptacle so that drain water is in contact therewith thus making the spoons insanitary and uninviting where the bowls of the spoons engage the bottom of the receptacle, or if the spoons are maintained in a receptacle with the bowls upwardly a spoon is taken from the receptacle by grasping the bowl of the spoon which is obviously undesirable.

The invention will be described in detail hereinafter and will be found illustrated in the accompanying drawings, in which Figure 1 is a side view in elevation of the improved spoon receptacle, Figure 2 is a vertical sectional view on a plane indicated by the line 2—2 of Figure 1, and Figure 3, a view in perspective of the strainer.

In the drawings similar reference characters will be used to designate corresponding parts throughout the several views.

The improved spoon holder comprises an annular base 1 having its upstanding flange 2 internally threaded as shown at 3 to receive the threaded cylindrical lower portion 4 of the conical-shaped upper member 5, this conical-shaped feature being provided to accommodate the bowls of spoons placed in the receptacle with the bowls downwardly. A strainer is provided and comprises a circular disk 6 having a plurality of perforations 7 and having legs 8 to support the strainer by resting on the internal flange 2' of the annular base 1. Base 1 is preferably supported on legs 9, but may obviously be constructed without said legs and it is designed that the article may be made of any suitable material and may be made more or less decorative as may suit the taste of the manufacturer or user, and when in use the spoons or other articles are placed in the upper member 5 with the bowls of the spoons or the tines of the forks or whatever articles are placed therein resting on the disk 6 so that any water adhering to the spoons or other articles will be drained from the bowls of the spoons through the openings 7 into the cup-shaped receptacle 1. The provision of a separable structure by means of the threaded portions 3 and 4 provides for keeping the article thoroughly clean and sanitary.

What is claimed is:—

A spoon holder, comprising an annular base member, said member being internally screw threaded, a conical upper member having a cylindrical rim on its lower edge and threaded to engage the threads on the annular member, said base member having an internal flange and a perforated plate having legs resting on said flange and providing a strainer to support the bowls of spoons placed in the upper member and to drain water therefrom through the base member.

In testimony whereof I affix my signature.

EDWARD ORMAN.